United States Patent
Dong (10) Patent No.: US 12,445,249 B2
(45) Date of Patent: Oct. 14, 2025

(54) POSITIONING REFERENCE SIGNALING CONFIGURATION METHOD AND APPARATUS, USER EQUIPMENT, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 277 days.

(21) Appl. No.: 18/003,897

(22) PCT Filed: Jun. 29, 2020

(86) PCT No.: PCT/CN2020/099010
§ 371 (c)(1),
(2) Date: Dec. 29, 2022

(87) PCT Pub. No.: WO2022/000200
PCT Pub. Date: Jan. 6, 2022

(65) Prior Publication Data
US 2023/0269047 A1  Aug. 24, 2023

(51) Int. Cl.
*H04L 5/00* (2006.01)
(52) U.S. Cl.
CPC .................... *H04L 5/0051* (2013.01)
(58) Field of Classification Search
None
See application file for complete search history.

(56) References Cited

U.S. PATENT DOCUMENTS

| | | | |
|---|---|---|---|
| 10,327,109 B1* | 6/2019 | Maheshwari | H04W 4/029 |
| 2018/0220392 A1 | 8/2018 | Ly | |
| 2019/0327706 A1* | 10/2019 | Agnihotri | H04W 24/10 |
| 2020/0028648 A1 | 1/2020 | Akkarakaran et al. | |
| 2020/0107209 A1 | 4/2020 | Ratasuk et al. | |
| 2020/0145977 A1 | 5/2020 | Kumar et al. | |
| 2020/0154240 A1 | 5/2020 | Edge et al. | |
| 2021/0297216 A1* | 9/2021 | Shreevastav | G01S 1/20 |

FOREIGN PATENT DOCUMENTS

| | | |
|---|---|---|
| CN | 107360617 A | 11/2017 |
| WO | 2019027595 A1 | 2/2019 |
| WO | 2019209746 A1 | 10/2019 |

OTHER PUBLICATIONS

"On Demand Transmission of PRS for NR," Proceedings of the 3GPP TSG-RAN WG2 Meeting #104, Qualcomm Incorporated, R2-1817902, Nov. 16, 2018, Spokane, Washington, 27 pages.

(Continued)

*Primary Examiner* — Diane L Lo
(74) *Attorney, Agent, or Firm* — McCoy Russell LLP (57) ABSTRACT

A positioning reference signal (PRS) configuration method, performed by a location management function (LMF) includes: determining a user equipment (UE) specific positioning reference signaling (PRS) configuration for the UE in response to determining that a cell specific PRS configuration used for positioning of the UE does not meet positioning demands of the UE; and sending the determined UE specific PRS configuration.

17 Claims, 5 Drawing Sheets

(56) References Cited

OTHER PUBLICATIONS

"On-demand PRS transmission," Proceedings of the 3GPP TSG-RAN WG2 Meeting #106, R2-1907767, May 13, 2019, Reno, Nevada, 2 pages.
"On-demand and dynamic PRS configuration for DL-TDOA," Proceedings of the 3GPP TSG-RAN WG2 Meeting #108, Nokia, Nokia Shanghai Bell, R2-1916106, Update of R2-1913594, Nov. 18, 2019, Reno, Nevada, 5 pages.

* cited by examiner

POSITIONING REFERENCE SIGNALING CONFIGURATION METHOD AND APPARATUS, USER EQUIPMENT, AND STORAGE MEDIUM

CROSS REFERENCE TO RELATED APPLICATIONS

The present application is a U.S. National Phase of International Application No. PCT/CN2020/099010 entitled "POSITIONING REFERENCE SIGNAL CONFIGURATION METHOD AND APPARATUS, USER EQUIPMENT, AND STORAGE MEDIUM," and filed on Jun. 29, 2020. The entire contents of each of the above-listed applications are hereby incorporated by reference for all purposes.

BACKGROUND

At present, a cell only supports one set of PRS configuration at a time, and all users in the cell use the same PRS configuration. However, considering positioning demands of different users, positioning types may be different. Hence, the different users have different demands for the PRS configuration, so as to meet the different positioning demands such as different positioning accuracy and delay.

SUMMARY

According to a first aspect of an example of the disclosure, a positioning reference signaling configuration method is provided. The positioning reference signaling configuration method is performed by a location management function (LMF) and includes:
  determining a user equipment (UE) specific positioning reference signaling (PRS) configuration for the UE in response to determining that a cell specific PRS configuration used for positioning of the UE does not meet positioning demands of the UE, and sending the determined UE specific PRS configuration.

According to a second aspect of an example of the disclosure, a positioning reference signaling configuration method is provided. The positioning reference signaling configuration method is performed by a UE and includes:
  receiving a downlink message carrying a UE specific PRS configuration and sent by a network device, receiving a UE specific PRS based on the UE specific PRS configuration, and performing positioning based on the UE specific PRS.

According to a third aspect of an example of the disclosure, user equipment is provided and includes a processor, a transceiver, a memory, and an executable program stored on the memory and capable of being run by the processor, where the processor, when running the executable program, executes the steps of the positioning reference signaling configuration method according to the first aspect or the second aspect of the example of the disclosure.

According to a fourth aspect of an example of the disclosure, a non-transitory computer readable storage medium is provided and stores an executable program, where the executable program, when being executed by a processor, implements the steps of the positioning reference signaling configuration method according to the first aspect or the second aspect of the example of the disclosure.

It should be understood that the above general description and the following detailed description are illustrative and explanatory, and cannot limit the examples of the disclosure.

BRIEF DESCRIPTION OF THE DRAWINGS

The accompanying drawings here, which are incorporated in and constitute a part of this specification, illustrate examples consistent with the disclosure and, together with the specification, serve to explain the principles of the examples of the disclosure.

DETAILED DESCRIPTION

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with examples of the disclosure. On the contrary, they are examples of an apparatus and a method consistent with some aspects of the examples of the disclosure as detailed in the appended claims.

The terms used in the examples of the disclosure are for the purpose of describing the particular examples, and are not intended to limit the examples of the disclosure. The singular forms "a", "the" and "this" used in the examples of the disclosure and the appended claims are intended to include the plural forms as well, unless the context clearly indicates otherwise. It should be further understood that the term "and/or" used here refers to and contains any and all possible combinations of one or more associated listed items.

It should be understood that the terms "first", "second", "third" and the like may be employed in the examples of the disclosure to describe various information, but these information should not be limited to these terms. These terms are used for distinguishing the same type of information from one another. For example, in a case of not departing from the scope of the examples of the disclosure, first information may also be called second information, and similarly, the second information may also be called the first information.

Depending on the context, the word if as used here may be interpreted as "at the time of" or "when" or "in response to determining".

Figure 1:
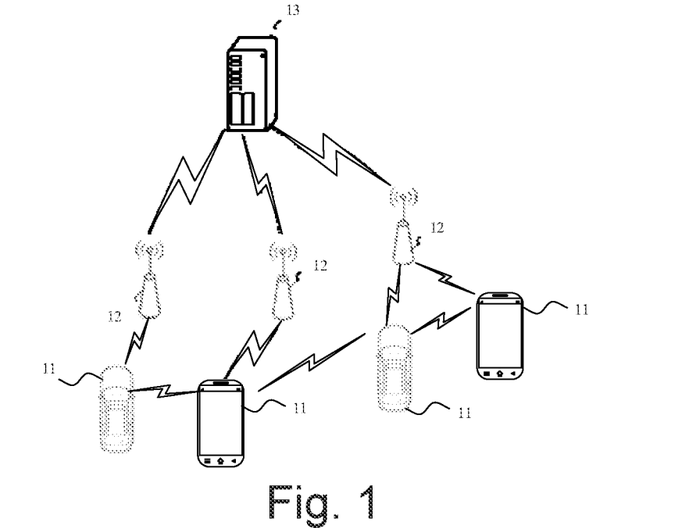
FIG. 1 is a schematic structural diagram of a wireless communication system shown according to an example.

Please refer to FIG. 1, which illustrates a schematic structural diagram of a wireless communication system provided by an example of the disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with voice and/or data connectivity. The terminals 11 may communicate with one or more core networks via a radio access network (RAN). The terminals 11 may be Internet of Things terminals, such as sensor devices, mobile phones (or called "cellular" phones) and computers with Internet of Things terminals. For instance, the terminals may be fixed, portable, pocket-size, handheld, computer built-in or vehicle-mounted apparatuses. For instance, the terminal may be a station (STA), a subscriber unit, a subscriber station, a mobile station, a mobile, a remote station, an access point, a remote terminal, an access terminal, a user terminal, a user agent, a user device or user equipment (UE). Or, the terminals 11 may also be unmanned aircraft devices. Or, the terminals 11 may also be vehicle-mounted devices, such as a trip computer with a wireless communication function, or a wireless communication device connected with an external trip computer. Or, the terminals 11 may also be roadside devices, such as a street lamp, a signal light or other roadside devices with wireless communication functions.

The base stations 12 may be network side devices in the wireless communication system. The wireless communication system may be the 4th generation mobile communication (4G) system, also known as a long term evolution (LTE) system; or the wireless communication system may also be a 5G system, also known as a new radio (NR) system or a 5G NR system. Or, the wireless communication system may also be a next-generation system of the 5G system. An access network in the 5G system may be called a new generation-radio access network (NG-RAN). Or the wireless communication system may be an MTC system.

The base stations 12 may be evolved base stations (eNB) adopted in the 4G system. Or, the base stations 12 may also be base stations (gNB) adopting centralized and distributed architectures in the 5G system. When the base stations 12 adopt the centralized and distributed architectures, they typically include a central unit (CU) and at least two distributed units (DU). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 12 are not limited in the example of the disclosure.

The base stations 12 and the terminals 11 may establish wireless connection through a wireless radio. In different implementations, the wireless radio is a wireless radio based on the 4G standard; or, the wireless radio is a wireless radio based on the 5G standard, such as a new radio; or, the wireless radio may also be a wireless radio based on the next-generation mobile communication standard of 5G.

In some examples, the terminals 11 may also establish end to end (E2E) connection. For instance, vehicle to vehicle (V2V) communication, vehicle to infrastructure (V2I) communication and vehicle to pedestrian (V2P) communication in vehicle to everything (V2X) communication and other scenarios.

In some examples, the above wireless communication system may further include a network management device 13.

The plurality of base stations 12 are connected with the network management device 13. The network management device 13 may be a core network device in the wireless communication system, for instance, the network management device 13 may be a mobility management entity (MME) in an evolved packet core (EPC). Or, the network management device may also be other core network devices, such as a serving gateway (SGW), a public data network gateway (PGW), a policy and charging rules function (PCRF) or a home subscriber server (HSS). The implementation form of the network management device 13 is not limited in the example of the disclosure.

An execution entity involved in the example of the disclosure includes, but not limited to user equipment (UE) in a cellular mobile communication system, a base station for cellular mobile communication and the like.

The 5G protocol R16 introduces a variety of positioning technologies to position the UE. For some of these positioning technologies, the base station gNB needs to configure a PRS to be sent. Taking DL-TDOA as an example, a PRS configuration mode of the base station in R16 is mainly the following process: an LMF requests DL-TDOA LPP provide assistance data from gNB, and gNB sends a response message to the LMF after receiving the request. The response message contains PRS configuration information of the base station, and the base station sends PRS according to the PRS configuration information.

After receiving the PRS configuration information of the base station, the LMF sends the LPP provide assistance data to the UE, and the LPP provide assistance data contains the PRS configuration information, which may be sent to the UE through an LTE positioning protocol (LPP) message. The LMF may send the PRS configuration information of the base station to the UE, or the LMF sends the LPP provide assistance data to the base station, and the base station sends a PRS configuration to the UE through a system message in a broadcasting mode. For the PRS configuration in R16, all UE in each cell uses one set of PRS configuration, that is, the PRS configuration in R16 is cell specific. When the PRS configuration is changed, the PRS configuration when all the UE in the cell is positioned will be changed. For this reason, it needs to separately send the corresponding PRS configuration merely for the UE whose demands cannot be met based on the cell PRS positioning, that is, to provide PRS for the UE in a differentiated mode.

Examples of the disclosure relate to a positioning reference signaling (PRS) configuration technology, in particular to a positioning reference signaling configuration method and apparatus, user equipment, and a storage medium.

Figure 2:
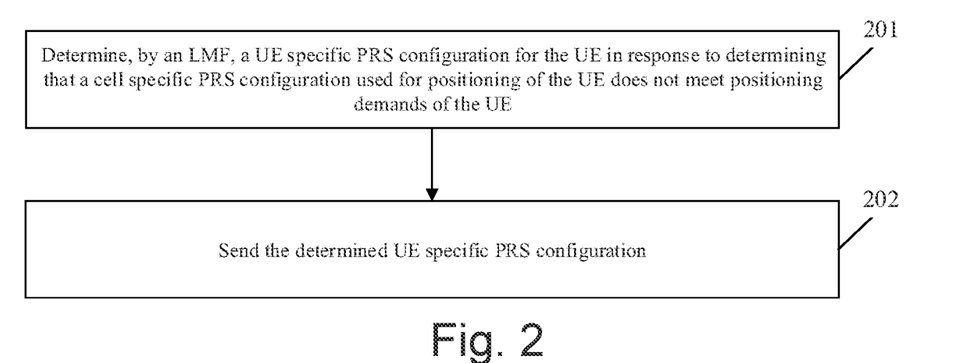
FIG. 2 is a schematic flow diagram of a positioning reference signaling configuration method shown according to an example.

FIG. 2 is a schematic flow diagram of a positioning reference signaling configuration method shown according to an example. As shown in FIG. 2, the positioning reference signaling configuration method in the example of the disclosure includes the following processing steps:

step 201, a UE specific PRS configuration is determined for the UE by an LMF in response to determining that a cell specific PRS configuration used for positioning of the UE does not meet positioning demands of the UE.

In the example of the disclosure, after the LMF receives a location request for the UE, if the current cell specific PRS configuration cannot meet the positioning demands of the UE, the UE specific PRS configuration is configured for the UE. Specifically, after receiving the location request for the UE, the LMF evaluates whether the current cell specific PRS configuration meets the positioning demands of the UE. If not, the LMF sends an NR positioning protocol A (NRPPa) message to a base station (gNB). The NRPPa message contains the UE specific PRS configuration determined for the UE.

The LMF receives a location request message for the UE, and determines, based on the location request message, that the cell specific PRS configuration of the UE does not meet the positioning demands of the UE. As an implementation, the LMF may determine indication information that the cell specific PRS configuration does not meet the positioning demands of the UE according to a positioning type and positioning quality for service (QoS) demands contained in the location request message.

Step 202, the determined UE specific PRS configuration is sent.

In one example, the LMF sends the UE specific PRS configuration to the UE through an LPP message. Specifically, the LPP message sent by the LMF to the UE contains LPP provide assistance data, and the LPP provide assistance data contains the UE specific PRS configuration.

Alternatively, the LMF determines the UE whose positioning demands cannot be met based on the cell specific PRS configuration, and sends identifications of the determined UE whose positioning demands cannot be met to the base station, and the base station sends the UE specific PRS configuration to these determined UE based on these UE identifications. Specifically, the LMF pre-determines the UE specific PRS configuration with the base station, and pre-configures the UE specific PRS configuration in the base station. When the LMF determines that the cell specific PRS configuration for the UE does not meet the positioning demands of the UE, the LMF sends indication information for enabling the UE specific PRS configuration and identification information of the UE whose positioning demands cannot be met based on the cell specific PRS configuration to the base station, and the base station enables the UE specific PRS configuration based on the indication information, and sends the UE specific PRS configuration to the determined UE to which the UE specific PRS configuration needs to be sent. That is, in the example of the disclosure, the base station that receives indication for sending the UE specific PRS configuration needs to send, based on the UE specific PRS configuration indicated or sent by the LMF, the UE specific PRS configuration to these UE according to the identifications of the UE to which the UE specific PRS configuration needs to be sent as notified by the LMF. Besides, the base station further needs to broadcast the cell specific PRS configuration in a cell.

In the example of the disclosure, the LMF may further directly send UE specific PRS configuration parameters determined for the UE to the base station, and the base station sends the UE specific PRS configuration to the corresponding UE according to the identifications of the UE to which the UE specific PRS configuration needs to be sent.

In the example of the disclosure, the configuration parameters of a UE specific PRS includes at least one of the following information: a sending period of the UE specific PRS, a sending start time of the UE specific PRS, or a sending beam of the UE specific PRS.

In the example of the disclosure, after the LMF determines the UE specific PRS configuration for the UE whose positioning demands are not met, when it needs to send the UE specific PRS configuration to these UE through the base station, the identification information of the UE to which the UE specific PRS configuration is applicable further needs to be sent to the base station. The UE to which the UE specific PRS configuration is applicable is all UE which is determined by the LMF and whose positioning demands cannot be met based on the cell specific PRS configuration. The LMF notifies the base station of the identification of the determined UE, and the base station sends the UE specific PRS configuration to these UE. If the UE specific PRS configuration is directly sent to these UE, the identification information of the UE to which the UE specific PRS configuration is applicable does not need to be sent to the base station.

As an example, the base station may send a downlink RRC message to the UE corresponding to the identification information based on the identification information of the UE to which the UE specific PRS configuration is applicable, and the RRC message carries UE specific PRS configuration resource information. The UE obtains UE specific PRS configuration information by means of receiving the RRC message, so as to receive the UE specific PRS sent by the base station.

Moreover, after the UE receives the UE specific PRS configuration information from the RRC message, the cell specific PRS configuration sent by the base station through the system message is ignored, that is, it does not need to receive a PRS according to the cell specific PRS configuration broadcast by the base station.

In addition, after the UE receives the UE specific PRS configuration from an LPP message sent by the LMF, the UE receives the PRS from the base station based on the UE specific PRS configuration, and the cell specific PRS configuration sent by the base station through the system message is also ignored, that is, it does not need to receive the PRS according to the cell specific PRS configuration broadcast by the base station.

According to the positioning reference signaling configuration method and apparatus, the user equipment and the storage medium of the examples of the disclosure, based on different demands for PRS configuration of different user equipment, the UE specific PRS configuration is configured for UE having a high positioning demand, so that the UE can send the UE specific PRS to a network side according to the UE specific PRS configuration, and the network side can position the UE more accurately based on the UE specific PRS. According to the examples of the disclosure, different PRS configurations are provided for UE having different positioning demands, and the UE monitors, according to its own demands, the cell specific PRS configuration or the UE specific PRS configuration, so that the different positioning demands of the UE are met.

Figure 3:
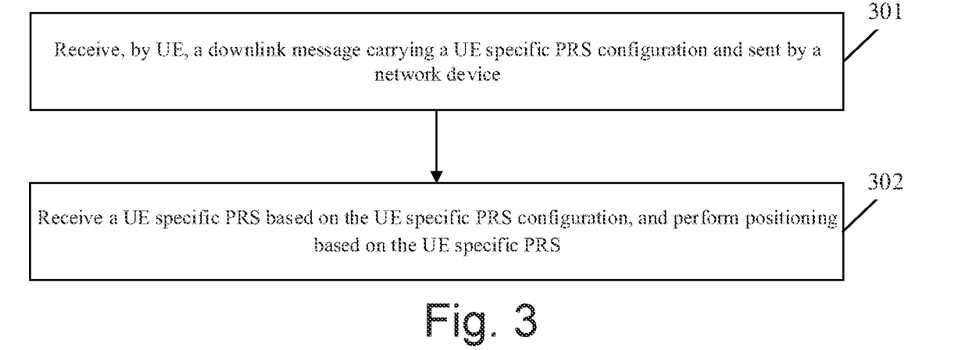
FIG. 3 is a schematic flow diagram of a positioning reference signaling configuration method shown according to an example.

FIG. 3 is a schematic flow diagram of a positioning reference signaling configuration method shown according to an example. As shown in FIG. 3, the positioning reference signaling configuration method in the example of the disclosure includes the following processing steps.

Step 301, UE receives a downlink message carrying a UE specific PRS configuration and sent by a network device.

A base station receives enabling indication information of the UE specific PRS configuration sent by an LMF or receives specific parameters of the UE specific PRS configuration sent by the LMF, and identification information of UE to which the UE specific PRS configuration is applicable, a downlink RRC message may be sent to the UE corresponding to the identification information, the RRC message carries UE specific PRS configuration resource information, so as to instruct the UE corresponding to the identification information to monitor the UE specific PRS configuration. The UE determines whether to need to monitor a UE specific PRS sent by the base station by monitoring a downlink control message sent by the base station, such as the RRC message. UE that needs to monitor the RRC message sent by the base station receives the UE specific PRS sent by the base station based on the UE specific PRS configuration resource information in the RRC message, otherwise, receives a PRS sent by the base station according to a cell specific PRS configuration in a message broadcast by the base station.

Alternatively, as an implementation, the UE directly receives the UE specific PRS configuration sent by the LMF through the LPP message.

When the UE determines, based on the RRC message sent by the base station or LPP provide assistance data sent by the LMF and borne in the LPP message, that the UE receives the UE specific PRS configuration, a cell specific PRS configuration sent by the network device through a system message is ignored.

For UE whose positioning demands can be met based on the cell specific PRS configuration, the cell specific PRS sent by the network device is still received based on the cell specific PRS configuration. For these UE, the UE specific PRS configuration is completely shielded from these UE, which does not affect their communication according to a normal communication process.

Step 302, the UE specific PRS is received based on the UE specific PRS configuration, and positioning is performed based on the UE specific PRS.

In the example of the disclosure, the UE specific PRS configuration in the downlink message is obtained by parsing the downlink message, and the UE specific PRS sent by the base station or the LMF is received based on the UE specific PRS configuration.

Specifically, the base station may send a downlink RRC message to the UE corresponding to the identification information based on the identification information of the UE to which the UE specific PRS configuration is applicable, and the RRC message carries UE specific PRS configuration resource information. The UE obtains UE specific PRS configuration information by means of receiving the RRC message, so as to receive the UE specific PRS sent by the base station. After the UE receives the UE specific PRS configuration information from the RRC message, the cell specific PRS configuration sent by the base station through the system message is ignored, that is, it does not need to receive a PRS according to the cell specific PRS configuration broadcast by the base station.

In addition, after the UE receives the UE specific PRS configuration from the LPP message sent by the LMF, the UE receives the PRS from the base station based on the UE specific PRS configuration, and the cell specific PRS configuration sent by the base station through the system message is also ignored, that is, it does not need to receive the PRS according to the cell specific PRS configuration broadcast by the base station.

In the example of the disclosure, the UE specific PRS configuration includes at least one of the following information: a sending period of the UE specific PRS, a sending start time of the UE specific PRS, or a sending beam of the UE specific PRS.

The UE receives the UE specific PRS sent by the base station or the LMF according to the UE specific PRS configuration, and positioning measurement is completed based on the UE specific PRS, so that the UE can be accurately positioned.

Those skilled in the art should understand that the positioning reference signaling configuration method shown in FIG. 3 is a positioning reference signaling configuration method entirely corresponding to the positioning reference signaling configuration method shown in FIG. 2. The positioning reference signaling configuration method shown in FIG. 3 is implemented based on the positioning reference signaling configuration method shown in FIG. 2. The two can also be combined to implement the technical solution of a new positioning reference signaling configuration method.

According to the positioning reference signaling configuration method of the examples of the disclosure, based on different demands for PRS configuration of different user equipment, the UE specific PRS configuration is configured for UE having a high positioning demand, so that a network side sends the UE specific PRS to these UE, and the UE is positioned more accurately and quickly based on the UE specific PRS. According to the examples of the disclosure, different PRS configurations are provided for UE having different positioning demands, and the UE monitors, according to network indication, the cell specific PRS configuration or the UE specific PRS configuration, so that the different positioning demands of the UE are met.

Due to the positioning demands of different users, positioning types may be different. Hence, the different users have different demands for the PRS configuration, so as to meet the different positioning demands such as different positioning accuracy and delay. Hence, in addition to the cell specific PRS configuration, the examples of the disclosure further introduce the UE specific PRS configuration, that is, the different PRS configurations may be configured for the different UE according to the positioning demands of the UE. Thus, at a certain moment, gNB/TRP may further send the PRS according to the UE specific PRS configuration in addition to sending the PRS according to the cell specific PRS configuration.

Figure 4:
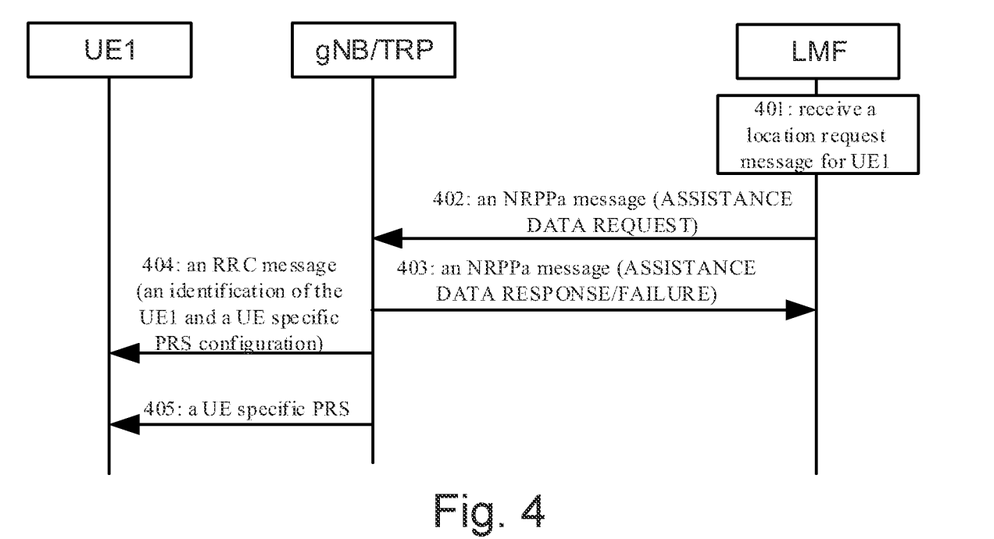
FIG. 4 is a schematic flow diagram of a positioning reference signaling configuration method shown according to an example.

FIG. 4 is a schematic flow diagram of a positioning reference signaling configuration method shown according to an example. As shown in FIG. 4, the positioning reference signaling configuration method in the present example includes the following processing steps.

Step 401: an LMF receives a location request message for UE1.

The LMF determines that a location demand of the UE1 is an emergency service based on the location request message, which needs low-delay and high-accuracy positioning. The LMF estimates that a cell specific PRS does not meet the positioning demand of the UE1.

Step 402, the LMF sends an NRPPa message to gNB/TRP.

The NRPPa message carries a UE specific PRS configuration. The LMF sends the UE specific PRS configuration to the gNB/transmission reception point (TRP) participating in UE1 positioning this time through the NRPPa message.

Step 403, the gNB/TRP sends the NRPPa message to the LMF to confirm that the UE specific PRS configuration is received successfully or unsuccessfully. In case of failure, the LMF sends the UE specific PRS configuration to the gNB/TRP again.

In the present example, the gNB/TRP, after receiving the NRPPa message sent by the LMF, sends the UE specific PRS configuration to the UE1 whose positioning demands cannot be met in addition to sending the cell specific PRS.

Step 404, the gNB/TRP sends an RRC message to the UE1.

The gNB/TRP sends a downlink RRC message to the UE1 after receiving the UE specific PRS configuration sent by the LMF. The RRC message carries identification information of the UE1 and the UE specific PRS configuration resource information.

Step 405, the gNB/TRP sends a UE specific PRS to the UE1.

The UE1 determines that it needs to monitor the UE specific PRS sent by the gNB/TRP by means of monitoring the downlink RRC message sent by the gNB/TRP. The UE1 receives the UE specific PRS sent by the gNB/TRP based on the UE specific PRS configuration resource information in the RRC message to complete positioning measurement; otherwise, the UE1 receives the cell specific PRS sent by the base station according to the cell specific PRS configuration in the gNB/TRP broadcast message to complete positioning measurement.

After receiving the UE specific PRS configuration, the UE1 will ignore the cell specific PRS configuration broadcast by the gNB/TRP.

Figure 5:
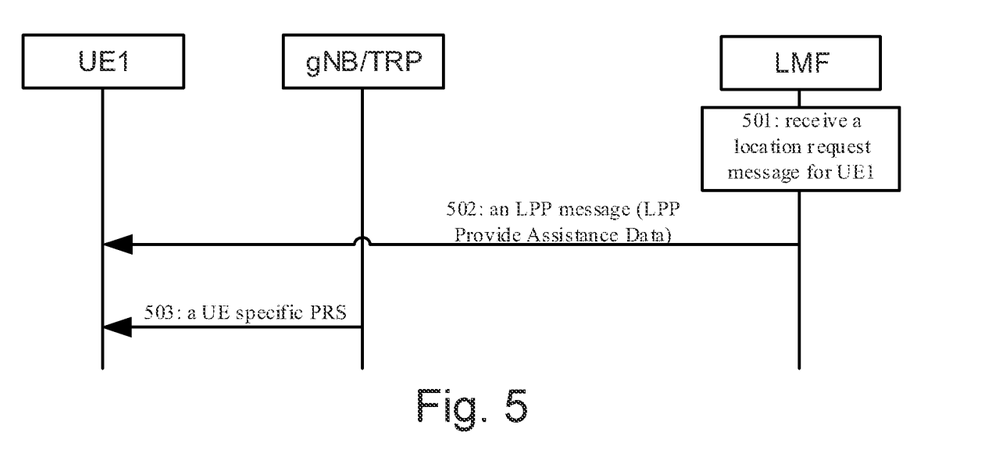
FIG. 5 is a schematic flow diagram of a positioning reference signaling configuration method shown according to an example.

FIG. 5 is a schematic flow diagram of a positioning reference signaling configuration method shown according to an example. As shown in FIG. 5, the positioning reference signaling configuration method in the present example includes the following processing steps.

Step 501, an LMF receives a location request message for UE1.

The LMF determines that a location demand of the UE1 is an emergency service based on the location request message, which needs low-delay and high-accuracy positioning. The LMF estimates that a cell specific PRS does not meet the positioning demand of the UE1.

Step 502, the LMF sends an LPP message to the UE1.

The LPP message carries LPP provide assistance data, and the LPP provide assistance data contains UE specific PRS configuration information and identification information of the UE1.

Step 503, the UE1 receives a UE specific PRS sent by gNB/TRP according to the UE specific PRS configuration information.

The UE1 receives a UE specific PRS configuration through the LPP provide assistance data sent by LMF, and receives the UE specific PRS sent by the gNB/TRP according to the received UE specific PRS configuration to complete positioning measurement.

After receiving the UE specific PRS configuration, the UE1 will ignore the cell specific PRS configuration broadcast by the gNB/TRP.

Figure 6:
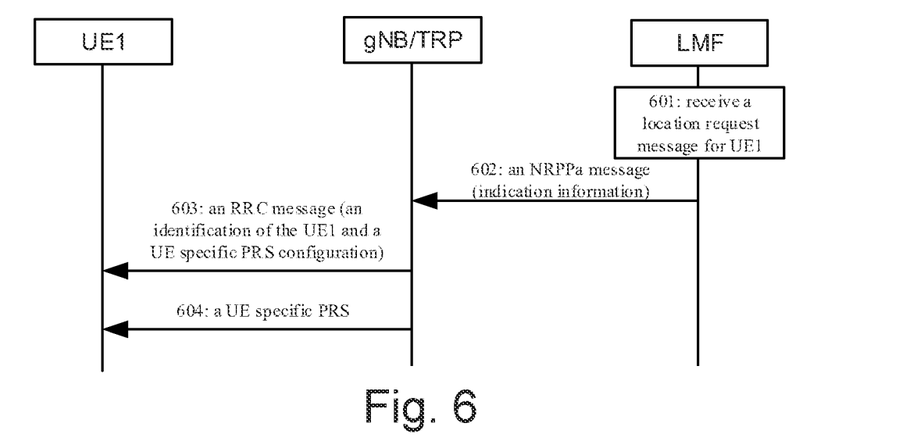
FIG. 6 is a schematic flow diagram of a positioning reference signaling configuration method shown according to an example.

FIG. 6 is a schematic flow diagram of a positioning reference signaling configuration method shown according to an example. As shown in FIG. 6, the positioning reference signaling configuration method in the present example includes the following processing steps.

Step 601, an LMF receives a location request message for UE1.

The LMF determines that a location demand of the UE1 is an emergency service based on the location request message, which needs low-delay and high-accuracy positioning. The LMF estimates that a cell specific PRS does not meet the positioning demand of the UE1.

Step 602, the LMF sends an NRPPa message to gNB/TRP.

The NRPPa message carries indication information, and the indication information instructs the gNB/TRP to enable the UE specific PRS configuration agreed between the LMF and gNB in advance, and contains identification information of the UE1.

Step 603, the gNB/TRP sends an RRC message to the UE1.

After receiving the indication information sent by the LMF, the gNB/TRP sends the corresponding UE specific PRS configuration to the UE1 according to indication of the indication information. Specifically, the gNB/TRP sends a downlink RRC message to the UE1, and the RRC message carries the identification information of the UE1 and the UE specific PRS configuration resource information.

Step 604, the gNB/TRP sends a UE specific PRS to the UE1.

The UE1 determines that it needs to monitor the UE specific PRS sent by the gNB/TRP by means of monitoring the downlink RRC message sent by the gNB/TRP. The UE1 receives the UE specific PRS sent by the gNB/TRP based on the UE specific PRS configuration resource information in the RRC message to complete positioning measurement; otherwise, the UE1 receives the cell specific PRS sent by the base station according to the cell specific PRS configuration in the gNB/TRP broadcast message to complete positioning measurement.

After receiving the UE specific PRS configuration, the UE1 will ignore the cell specific PRS configuration broadcast by the gNB/TRP.

Figure 7:
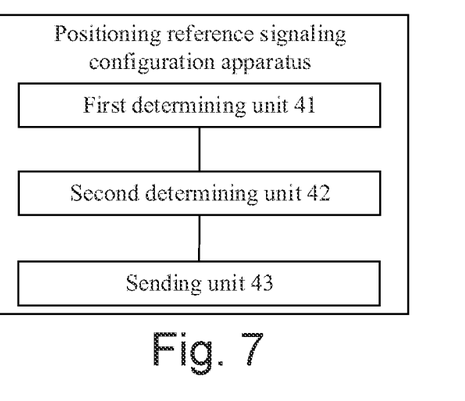
FIG. 7 is a schematic diagram of a composition structure of a positioning reference signaling configuration apparatus shown according to an example.

FIG. 7 is a schematic diagram of a composition structure of a positioning reference signaling configuration apparatus shown according to an example. As shown in FIG. 7, the positioning reference signaling configuration apparatus in the example of the disclosure includes:

a first determining unit 41, configured to determine whether a cell specific positioning reference signaling (PRS) configuration used for user equipment (UE) meets positioning demands of the UE, and trigger a second determining unit 42 in response to determining that the positioning demands of the UE are not met;

the second determining unit 42, configured to determine a UE specific PRS configuration for the UE; and a sending unit 43, configured to send the cell specific PRS configuration and at least one set of the determined UE specific PRS configuration.

In one example, the first determining unit 42 is further configured to:

determine that the cell specific PRS configuration for the UE does not meet the positioning demands of the UE based on a location request message for the UE.

Based on the positioning reference signaling configuration apparatus shown in FIG. 7, the positioning reference signaling configuration apparatus of the example of the disclosure further includes:

a configuring unit (not shown in FIG. 7), configured to pre-determine, with a base station, the UE specific PRS configuration, and pre-configure the UE specific PRS configuration in the base station.

The first determining unit 41 is further configured to trigger, in response to determining that the cell specific PRS configuration for the UE does not meet the positioning demands of the UE, the sending unit 43 to send indication information for enabling the UE specific PRS configuration to the base station, so that the base station enables the UE specific PRS configuration based on the indication information.

In one example, the first determining unit 41 is further configured to trigger, in response to determining that the cell specific PRS configuration for the UE does not meet the positioning demands of the UE, the sending unit 43 to send configuration parameters of a UE specific PRS to the base station.

In one example, the configuration parameters of the UE specific PRS includes at least one of the following information: a sending period of the UE specific PRS, a sending start time of the UE specific PRS, or a sending beam of the UE specific PRS.

In one example, the sending unit 43 is further configured to:
send identification information of the UE to which the UE specific PRS configuration is applicable to the base station, so that the base station sends a downlink radio resource control (RRC) message to the UE corresponding to the identification information based on the identification information of the UE to which the UE specific PRS configuration is applicable, where the RRC message carries the UE specific PRS configuration resource information.

In one example, the sending unit 43 is further configured to:
send LPP provide assistance data to the UE, the LPP provide assistance data carrying the UE specific PRS configuration, so that the UE receives a UE specific PRS based on the UE specific PRS configuration.

In an example, the first determining unit 41, the second determining unit 42, the sending unit 43, the configuring unit and the like may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general processors, controllers, micro controller units (MCUs), microprocessors, or other electronic components, or may be implemented in combination with one or more radio frequency (RF) antennas, for executing the aforementioned positioning reference signaling configuration method.

In the example of the disclosure, the specific modes for executing operations by all the units in the positioning reference signaling configuration apparatus shown in FIG. 7 have been described in the examples related to the method in detail, which is not set forth in detail here.

Figure 8:
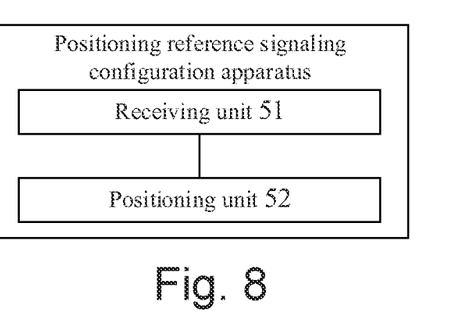
FIG. 8 is a schematic diagram of a composition structure of a positioning reference signaling configuration apparatus shown according to an example.

FIG. 8 is a schematic diagram of a composition structure of a positioning reference signaling configuration apparatus shown according to an example. As shown in FIG. 8, the positioning reference signaling configuration apparatus in the example of the disclosure includes:
a receiving unit 51, configured to receive a downlink message carrying a UE specific PRS configuration and sent by a network device, and receive a UE specific PRS based on the UE specific PRS configuration; and
a positioning unit 52, configured to perform positioning based on the UE specific PRS.

In one example, the receiving unit 51 is further configured to:
ignore a cell specific PRS configuration sent by the network device through a system message in response to determining that the UE receives the UE specific PRS configuration based on a RRC message sent by a base station or LPP provide assistance data sent by an LMF.

In one example, the receiving unit 51 is further configured to:
receive a downlink control message sent by the base station, the downlink control message carrying resource information bearing the UE specific PRS configuration; and determine the UE specific PRS configuration based on the downlink control message; or
receive LPP provide assistance data sent by an LMF, the LPP provide assistance data carrying resource information bearing the UE specific PRS configuration; and determine the UE specific PRS configuration based on the LPP provide assistance data.

In one example, the receiving unit 51 is further configured to:
receive a cell specific PRS sent by the base station based on a cell specific PRS configuration.

In one example, the UE specific PRS configuration includes at least one of the following information:
a sending period of the UE specific PRS, a sending start time of the UE specific PRS, or a sending beam of the UE specific PRS.

In an example, the receiving unit 51, the positioning unit 52 and the like may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general processors, controllers, micro controller units (MCUs), microprocessors, or other electronic components, or may be implemented in combination with one or more radio frequency (RF) antennas, for executing the aforementioned positioning reference signaling configuration method.

In the example of the disclosure, the specific modes for executing operations by all the units in the positioning reference signaling configuration apparatus shown in FIG. 8 have been described in the examples related to the method in detail, which is not set forth in detail here.

Those skilled in the art should understand that the positioning reference signaling configuration apparatus shown in FIG. 8 can cooperate with the positioning reference signaling configuration apparatus shown in FIG. 7 to form a positioning reference signaling configuration system. Based on the positioning reference signaling configuration system, the UE can be positioned more accurately.

According to the positioning reference signaling configuration apparatus of the examples of the disclosure, based on different demands for PRS configuration of different user equipment, the UE specific PRS configuration is configured for UE having a high positioning demand, so that the UE can send a UE specific PRS to a network side according to the UE specific PRS configuration, and the network side can position the UE more accurately based on the UE specific PRS. According to the examples of the disclosure, different PRS configurations are provided for UE having different positioning demands, and the UE monitors, according to its own demands, the cell specific PRS configuration or the UE specific PRS configuration, so that the different positioning demands of the UE are met.

Figure 9:
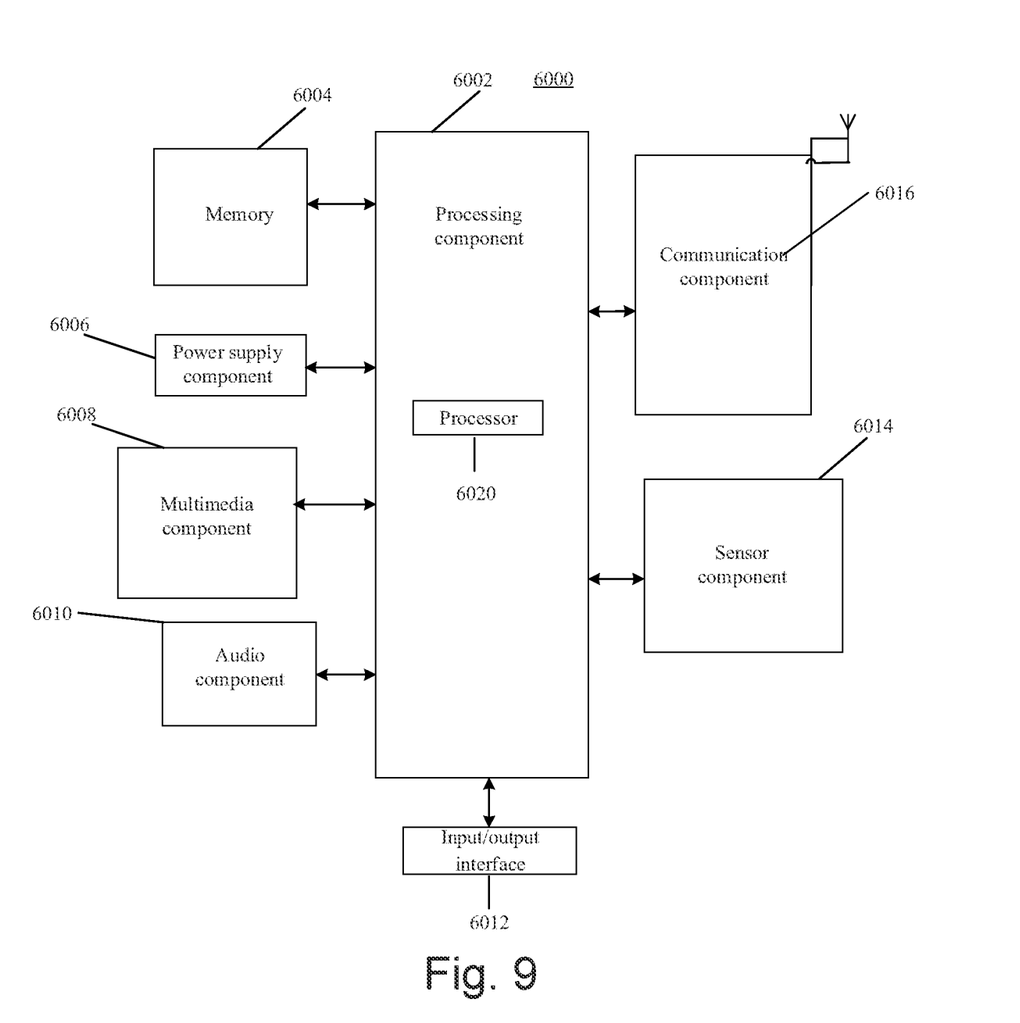
FIG. 9 is a schematic diagram of a composition structure of user equipment shown according to an example.

FIG. 9 is a block diagram of user equipment 6000 shown according to an example. For example, the user equipment 6000 may be a mobile telephone, a computer, a digital broadcast terminal, a message transceiving device, a game console, a tablet device, a medical device, a fitness device, a personal digital assistant, and the like.

Referring to FIG. 9, the user equipment 6000 may include one or more of the following components: a processing component 6002, a memory 6004, a power supply component 6006, a multimedia component 6008, an audio component 6010, an input/output (I/O) interface 6012, a sensor component 6014, and a communication component 6016.

The processing component 6002 usually controls overall operation of the user equipment 6000, such as operations associated with displaying, telephone calling, data communication, a camera operation and a record operation. The processing component 6002 may include one or more processors 6020 to execute an instruction, so as to complete all or part of steps of the above method. In addition, the processing component 6002 may include one or more modules, so as to facilitate interaction between the processing component 6002 and other components. For example, the processing component 6002 may include a multimedia module, so as to facilitate interaction between the multimedia component 6008 and the processing component 6002.

The memory 6004 is configured to store various types of data so as to support operations on the apparatus 6000. Examples of these data include instructions of any application programs or methods used to be operated on the user equipment 6000, contact data, telephone directory data, messages, pictures, videos, and the like. The memory 6004 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 6006 provides electric power for various components of the user equipment 6000. The power supply component 6006 may include a power management system, one or more power sources, and other components associated with generating, managing and distributing electric power for the user equipment 6000.

The multimedia component 6008 includes a screen providing an output interface between the user equipment 6000 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 6008 includes a front camera and/or a back camera. When the apparatus 6000 is in an operation mode, such as a shooting mode or a video mode, the front camera and/or the back camera may receive external multimedia data. Each front camera and each back camera may be a fixed optical lens system or have a focal length and optical zooming capability.

The audio component 6010 is configured to output and/or input an audio signal. For example, the audio component 6010 includes a microphone (MIC). When the user equipment 6000 is in the operation mode, such as a call mode, a recording mode or a speech recognition mode, the microphone is configured to receive an external audio signal. The received audio signal may be further stored in the memory 6004 or sent via the communication component 6016. In some examples, the audio component 6010 further includes a speaker for outputting the audio signal.

The I/O interface 6012 provides an interface between the processing component 6002 and a peripheral interface module, and the above peripheral interface module may be a keyboard, a click wheel, buttons, etc. These buttons may include but are not limited to: a home button, a volume button, a start button and a lock button.

The sensor component 6014 includes one or more sensors for providing state evaluations of all aspects for the user equipment 6000. For example, the sensor component 6014 may detect an on/off state of the equipment 6000 and relative positioning of components, for example, the components are a display and a keypad of the user equipment 6000. The sensor component 6014 may further detect position change of the user equipment 6000 or one component of the user equipment 6000, whether there is contact between the user and the user equipment 6000, azimuth or speed up/speed down of the user equipment 6000, and temperature change of the user equipment 6000. The sensor component 6014 may include a proximity sensor, which is configured to detect existence of a nearby object without any physical contact. The sensor component 6014 may further include an optical sensor, such as a CMOS or CCD image sensor, for use in an imaging application. In some examples, the sensor component 6014 may further include an acceleration sensor, a gyroscope sensor, a magnetic sensor, a pressure sensor or a temperature sensor.

The communication component 6016 is configured to facilitate wired or wireless communication between the user equipment 6000 and other devices. The user equipment 6000 may access into a wireless network based on a communication standard, such as Wi-Fi, 2G or 3G, or their combination. In one example, the communication component 6016 receives a broadcast signal or broadcast related information from an external broadcast management system via a broadcast channel In an example, the communication component 6016 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the user equipment 6000 may be implemented by one or more application specific integrated circuits (ASICs), digital signal processors (DSPs), digital signal processing devices (DSPDs), programmable logic devices (PLDs), field-programmable gate arrays (FPGAs), controllers, micro controller units, microprocessors or other electronic elements for executing the above positioning reference signaling configuration method.

In the example, a non-transitory computer readable storage medium including instructions is further provided, such as a memory 6004 including instructions. The above instructions may be executed by a processor 6020 of the user equipment 6000 so as to complete the above positioning reference signaling configuration method. For example, the non-transitory computer readable storage medium may be an ROM, a random access memory (RAM), a CD-ROM, a magnetic tape, a floppy disk, an optical data storage device and the like.

Those of skill in the art will easily figure out other implementation solutions of examples of the disclosure after considering the specification and practicing the disclosure disclosed here. The application intends to cover any transformation, usage or adaptive change of the examples of the disclosure, and these transformations, usages or adaptive changes conform to a general principle of the examples of the disclosure and include common general knowledge or conventional technical means which are not disclosed in the examples of the disclosure in the technical field. The specification and the examples are regarded as an example, and the true scope and spirit of the examples of the disclosure are indicated by the following claims.

It will be appreciated that the examples of the disclosure are not limited to the exact construction that has been described above and shown in the accompanying drawings, and that various modifications and changes can be made without departing from its scope. The scope of the examples of the disclosure is limited by the appended claims.

The invention claimed is:

1. A positioning reference signaling configuration method, performed by a location management function (LMF) and comprising:
   determining a user equipment (UE) specific positioning reference signaling (PRS) configuration for the UE in response to determining that a cell specific PRS configuration used for positioning of the UE does not meet positioning demands of the UE;
   sending the determined UE specific PRS configuration, wherein the UE is configured to ignore the cell specific PRS configuration sent by a base station through a system message in response to determining that the UE receives the UE specific PRS configuration based on a RRC message sent by the base station or long term evolution positioning protocol (LPP) provide assistance data sent by the LMF; and
   sending identification information of the UE to which the UE specific PRS configuration is applicable to the base station, wherein the identification information is configured to indicate that the base station sends the UE specific PRS configuration to a UE applicable to the UE specific PRS configuration.

2. The positioning reference signaling configuration method according to claim 1, wherein determining that the cell specific PRS configuration used for positioning of the UE does not meet the positioning demands of the UE comprises:
   receiving a location request message for the UE, and determining based on the location request message, that the cell specific PRS configuration used for positioning of the UE does not meet the positioning demands of the UE.

3. The positioning reference signaling configuration method according to claim 1, further comprising:
   pre-determining the UE specific PRS configuration with a base station, and pre-configuring the UE specific PRS configuration in the base station; and
   sending in response to determining that the cell specific PRS configuration for the UE does not meet the positioning demands of the UE, indication information for enabling the UE specific PRS configuration to the base station.

4. The positioning reference signaling configuration method according to claim 1, further comprising:
   sending configuration parameters of a UE specific PRS to the base station in response to determining that the cell specific PRS configuration for the UE does not meet the positioning demands of the UE.

5. The positioning reference signaling configuration method according to claim 4, wherein the configuration parameters of the UE specific PRS comprise at least one of the following:
   a sending period of the UE specific PRS, a sending start time of the UE specific PRS, or a sending beam of the UE specific PRS.

6. The positioning reference signaling configuration method according to claim 1, further comprising:
   sending LPP provide assistance data to the UE, wherein the LPP provide assistance data carries the UE specific PRS configuration.

7. A user equipment, comprising a processor, a transceiver, a memory, and an executable program stored on the memory and capable of being run by the processor, wherein the processor, when running the executable program, executes the positioning reference signaling configuration method according to claim 1.

8. A non-transitory computer readable storage medium, storing an executable program, wherein the executable program, when being executed by a processor, implements the positioning reference signaling configuration method according to claim 1.

9. A positioning reference signaling configuration method, performed by a user equipment (UE) and comprising:
   receiving a downlink message carrying a UE specific positioning reference signaling (PRS) configuration and sent by a network device, wherein the UE specific PRS configuration is determined for the UE whose positioning demands are not met by a cell specific PRS configuration;
   receiving a UE specific PRS based on the UE specific PRS configuration;
   performing positioning based on the UE specific PRS; and
   ignoring the cell specific PRS configuration sent by a base station through a system message in response to determining that the UE receives the UE specific PRS configuration based on a RRC message sent by the base station or long term evolution positioning protocol (LPP) provide assistance data sent by an LMF;
   wherein the UE specific PRS configuration is sent to the UE by the base station based on identification information of the UE to which the UE specific PRS configuration is applicable, and the identification information of the UE to which the UE specific PRS configuration is applicable is sent to the base station by the LMF.

10. The positioning reference signaling configuration method according to claim 9, further comprising:
    receiving a downlink control message sent by the base station, the downlink control message carrying resource information bearing the UE specific PRS configuration; and determining the UE specific PRS configuration based on the downlink control message; or
    receiving LPP provide assistance data sent by an LMF, the LPP provide assistance data carrying resource information bearing the UE specific PRS configuration; and determining the UE specific PRS configuration based on the LPP provide assistance data.

11. The positioning reference signaling configuration method according to claim 9, further comprising:
    receiving a cell specific PRS configuration sent by the network device, and sending a cell specific PRS based on the cell specific PRS configuration.

12. The positioning reference signaling configuration method according to claim 9, wherein the UE specific PRS configuration comprises at least one of the following:
    a sending period of the UE specific PRS, a sending start time of the UE specific PRS, or a sending beam of the UE specific PRS.

13. A non-transitory computer readable storage medium, storing an executable program, wherein the executable program, when being executed by a processor, implements the positioning reference signaling configuration method according to claim 9.

14. A user equipment (UE), comprising a processor, a transceiver, a memory, and an executable program stored on the memory and capable of being run by the processor, wherein the processor is configured to:
    receive a downlink message carrying a UE specific positioning reference signaling (PRS) configuration and sent by a network device, wherein the UE specific PRS configuration is determined for the UE whose positioning demands do not be met by a cell specific PRS configuration;

receive a UE specific PRS based on the UE specific PRS configuration;

perform positioning based on the UE specific PRS; and ignoring the cell specific PRS configuration sent by a base station through a system message in response to determining that the UE receives the UE specific PRS configuration based on a RRC message sent by the base station or long term evolution positioning protocol (LPP) provide assistance data sent by an LMF;

wherein the UE specific PRS configuration is sent to the UE by the base station based on identification information of the UE to which the UE specific PRS configuration is applicable, and the identification information of the UE to which the UE specific PRS configuration is applicable is sent to the base station by the LMF.

15. The user equipment according to claim 14, wherein the processor is configured to:

receive a downlink control message sent by the base station, the downlink control message carrying resource information bearing the UE specific PRS configuration; and determine the UE specific PRS configuration based on the downlink control message; or receive LPP provide assistance data sent by an LMF, the LPP provide assistance data carrying resource information bearing the UE specific PRS configuration; and determine the UE specific PRS configuration based on the LPP provide assistance data.

16. The user equipment according to claim 14, wherein the processor is configured to:

receive a cell specific PRS configuration sent by the network device, and send a cell specific PRS based on the cell specific PRS configuration.

17. The user equipment according to claim 14, wherein the UE specific PRS configuration comprises at least one of the following:

a sending period of the UE specific PRS, a sending start time of the UE specific PRS, or a sending beam of the UE specific PRS.

* * * * *